United States Patent
Davis, II et al.

(10) Patent No.: US 10,161,650 B2
(45) Date of Patent: Dec. 25, 2018

(54) RETROFIT ASSEMBLY FOR OPERATING A MOTOR OF AN HVAC SYSTEM AS A MULTI-STAGE MOTOR AND AN HVAC SYSTEM INCLUDING THE RETROFIT ASSEMBLY

(71) Applicant: Lennox Industries Inc., Richardson, TX (US)

(72) Inventors: Walter Davis, II, Carrollton, TX (US); Eric M. Perez, Carrollton, TX (US); Eric Chanthalangsy, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 430 days.

(21) Appl. No.: 14/724,477

(22) Filed: May 28, 2015

(65) Prior Publication Data
US 2016/0348939 A1   Dec. 1, 2016

(51) Int. Cl.
*F24F 11/77*   (2018.01)
*F24F 1/22*   (2011.01)
*F24F 13/20*   (2006.01)
*F24F 11/46*   (2018.01)

(52) U.S. Cl.
CPC ............. *F24F 11/77* (2018.01); *F24F 1/22* (2013.01); *F24F 11/46* (2018.01); *F24F 2013/207* (2013.01); *Y02B 30/746* (2013.01)

(58) Field of Classification Search
CPC .......... F24F 11/0079; F24F 13/00; F24F 1/22; F24F 2011/0075; F24F 2013/207; G05D 23/2754
See application file for complete search history.

(56) References Cited

U.S. PATENT DOCUMENTS

| | | | |
|---|---|---|---|
| 4,085,594 A | 4/1978 | Mayer | |
| 4,293,027 A | 10/1981 | Tepe et al. | |
| 5,161,608 A | 11/1992 | Osheroff | |
| 5,237,826 A * | 8/1993 | Baldwin | F24F 3/044 174/72 A |
| 6,009,717 A * | 1/2000 | Hernandez | F24F 1/027 62/262 |
| 6,123,435 A * | 9/2000 | Wang | F21V 15/01 362/147 |
| 6,246,207 B1 | 6/2001 | VanSistine et al. | |
| 7,272,302 B2 | 9/2007 | Woodward et al. | |
| 7,673,809 B2 | 3/2010 | Juntunen | |

(Continued)

*Primary Examiner* — Filip Zec
(74) *Attorney, Agent, or Firm* — Hubbard Johnston, PLLC (57) ABSTRACT

Retrofit assemblies and an HVAC unit including a retrofit assembly are disclosed herein. In one embodiment, the retrofit assembly includes: (1) a base plate, that is mountable to a face of a motor speed driver (MSD), having an attachment area, (2) a standoff bracket that is mountable to the attachment area of the base plate and having a configuration that secures the MSD in a position relative to an interior wall of the HVAC system and provides clearance between the interior wall of the HVAC system and the MSD such that wires can be routed between the MSD and the interior wall and (3) a control interface, electrically connectable between the MSD and a thermostat of the HVAC system, configured to differentiate thermostat calls from the thermostat and translate the thermostat calls to coordinate blower speeds for the blower motor via the MSD.

4 Claims, 5 Drawing Sheets

(56) References Cited

U.S. PATENT DOCUMENTS

| | | |
|---|---|---|
| 2007/0084938 A1 | 4/2007 | Liu |
| 2007/0209653 A1 | 9/2007 | Beisheim et al. |
| 2007/0289322 A1 | 12/2007 | Mathews |
| 2011/0120167 A1* | 5/2011 | Lingrey .................. F24F 1/027 62/324.4 |
| 2011/0126568 A1* | 6/2011 | Okuda ...................... F24F 1/24 62/259.2 |
| 2013/0153197 A1 | 6/2013 | Havard, Jr. et al. |
| 2014/0117825 A1* | 5/2014 | Lee .......................... F24F 13/20 312/237 |
| 2014/0190679 A1* | 7/2014 | Roosli ..................... F24F 13/20 165/237 |

* cited by examiner

RETROFIT ASSEMBLY FOR OPERATING A MOTOR OF AN HVAC SYSTEM AS A MULTI-STAGE MOTOR AND AN HVAC SYSTEM INCLUDING THE RETROFIT ASSEMBLY

TECHNICAL FIELD

This application is directed, in general, to heating, ventilation, and air conditioning (HVAC) systems and, more specifically, to improving the energy efficiency of existing HVAC system installed in the field.

BACKGROUND

Various manufacturers produce HVAC systems, such as rooftop units (RTUs), capable of complying with the "two-speed" regulations for blower speeds that some require for certain HVAC systems. The multi-speed HVAC systems provide conditioning flexibility and reduce power consumption. Some customers, however, have existing single speed systems that are not due for replacement in the near future. Existing customers can wait for twelve to fifteen years before their HVAC system is worn out to justify the installation of a new system. During this time, the customers are unable to take advantage of improved HVAC systems and the energy saving operation of products such as a Multi-Stage Air Volume (MSAV) product.

SUMMARY

One aspect provides a retrofit assembly for a constant air volume HVAC system. In one embodiment, the retrofit assembly includes: (1) a base plate, that is mountable to a face of a motor speed driver (MSD), having an attachment area, (2) a standoff bracket that is mountable to the attachment area of the base plate and having a configuration that secures the MSD in a position relative to an interior wall of the HVAC system and provides clearance between the interior wall of the HVAC system and the MSD such that wires can be routed between the MSD and the interior wall of the HVAC system and (3) a control interface, electrically connectable between the MSD and a thermostat of the HVAC system, configured to differentiate thermostat calls from the thermostat and translate the thermostat calls to coordinate blower speeds for the blower motor via the MSD.

In another aspect, the disclosure provides an HVAC unit. In one embodiment, the HVAC unit includes: (1) a controller configured to direct operation of the HVAC unit to condition air for an enclosed space employing constant air volume and (2) a retrofit assembly configured to convert the HVAC unit to a Multi-Stage Air Volume HVAC unit, the retrofit assembly comprising a control interface configured to receive thermostat calls for operating the HVAC unit at the constant air volume and translate the thermostat calls to motor control signals to operate the HVAC unit as the Multi-Stage Air Volume HVAC unit.

Yet another aspect provides a retrofit assembly for converting a single speed motor of an HVAC unit to operate as a multi-speed motor. In one embodiment, this retrofit assembly includes: (1) a power supply conversion circuit including a motor speed driver (MSD) and configured to provide power to a motor of the HVAC unit via the MSD and a contactor for the motor, (2) a control interface configured to translate control signals for operating the motor at a single speed to motor control signals for operating the motor at multiple speeds, and provide the motor control signals to the MSD, (3) a base plate that is mountable to a face of the MSD and having a dimension that is larger than a dimension of the MSD to provide an attachment area and (4) a standoff bracket that is mountable to the attachment area of the base plate and having a configuration that secures the MSD in a position relative to an interior wall of the HVAC unit and provides clearance between the interior wall of the HVAC unit and the MSD such that wires can be routed between the MSD and the interior wall.

BRIEF DESCRIPTION

Reference is now made to the following descriptions taken in conjunction with the accompanying drawings, in which.

DETAILED DESCRIPTION

It is realized herein that converting constant air volume (CAV) HVAC systems that are already operating in the field, to MSAV HVAC systems would reduce power consumption. It is further realized, however, that converting an existing CAV system to a MSAV system without unacceptably disrupting the operation of the HVAC system is more than simply changing blower speeds. Accordingly, the disclosure provides a retrofit assembly that employs the current thermostat calls of the existing CAV system to convert a CAV HVAC system to a MSAV HVAC system. With the disclosed retrofit assembly, a customer can enjoy the benefits of a MSAV HVAC system without the cost of replacing their entire HVAC unit.

This disclosure provides various embodiments of a retrofit assembly that includes a motor speed driver (MSD) mounting system and an electrical conversion system. The retrofit assembly gives HVAC systems or products, such as RTUs, typically sold as CAV products, the ability to operate as MSAV products. In essence, the retrofit assembly changes the capability of a single speed blower motor to operate at multiple blower speeds without the need to rewire the HVAC system, compromise system performance, or add undue cost and complication to systems sold to customers who do not want or need multi-speed blowers. The retrofit assembly provides a system to mount and wire a MSD to control a blower motor that normally operates at a single speed so that it can accommodate multi-speed operation. The ability to retrofit an-after-market HVAC system in this manner gives flexibility to both consumers and manufactures. The consumer benefits because those who have an HVAC system with an older, single speed blower motor can use the retrofit assembly to change their existing unit to a multi-speed configuration. Manufacturers also benefit since they can continue to sell single speed blower motor units to those who do not need multi-speed capability.

Some embodiments of the retrofit assembly as provided herein include an electrical conversion system that electrically places a MSD between a controller of an HVAC system and the blower motor and repurposes a blower controlling contactor from an on/off switch into a distribution block. The repurposing of the contactor allows installation of the retrofit assembly without removing or rerouting existing wires of the already operating HVAC system. Additionally, the electrical conversion system provides a control interface through the MSD for a thermostat and the blower motor that allows the same thermostat calls used with the existing single speed blower of the HVAC system to be used to provide multi-speed control. For example, before installing a retrofit assembly, the thermostat would initiate the start of corresponding unit components for stage 1 cooling (Y1), stage 2 cooling (Y2), ventilation (G), or heating (W1). The electrical conversion system employs harnesses to rewire the existing control system of HVAC systems to differentiate each of the thermostat calls and provide the MSD with the correct translated motor control signal to coordinate the blower speed. A harness or wire harness is an assembly of wires, conductors or cables that are bound together and which transmit signals or electrical power. A MSD is a device used to control the speed of a motor. A MSD can be an adjustable speed drive or a variable speed drive.

Figure 1:
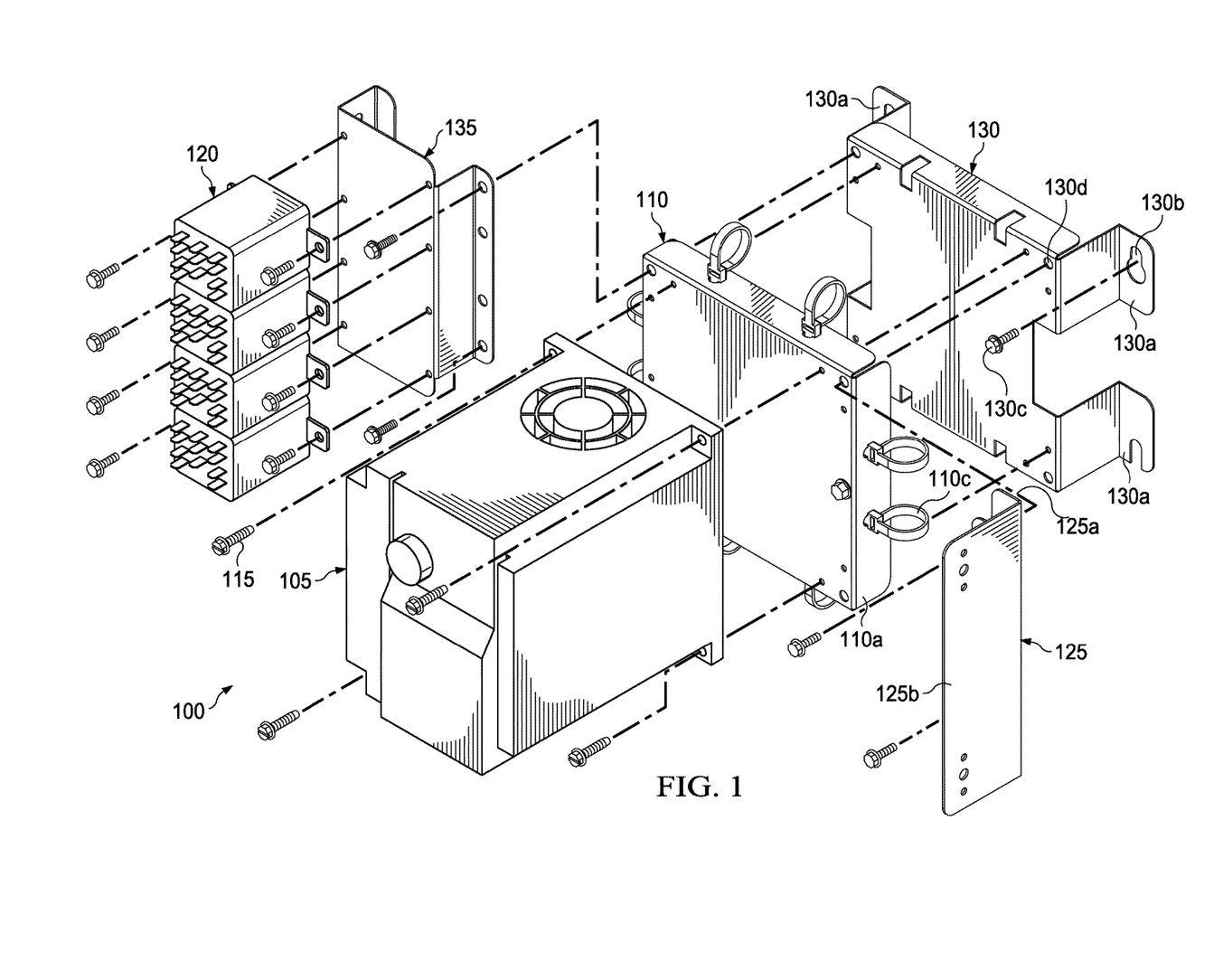
FIG. 1 illustrates an expanded view of one embodiment of a retrofit standoff mounting and wiring system constructed according to the principles of the disclosure.

FIG. 1 illustrates one embodiment of a retrofit MSD mounting system 100 constructed according to the principles of the disclosure. The retrofit MSD mounting system 100 can be used to mount a MSD 105 onto a wall located within a conventional HVAC unit, such as the above-mentioned RTU (not shown). In one embodiment, the MSD 105 is a variable frequency drive (VFD). The VFD can be a commercially available unit, and as such, will include electrical connectors, as explained in more detail below. In one embodiment the MSD includes an inverter.

The retrofit MSD mounting system 100 includes a base plate 110 that is attachable to the MSD 105. In one example, the base plate 110 is attachable to the MSD 105 with metal sheet screws 115. Other known mechanical mounting systems or adhesives may be used to attach the base plate 110 to the MSD 105. The base plate 110 provides a base that can be used to mount the MSD 105 in a standoff position with respect to an interior wall of an HVAC housing, and/or attach other components, such as an electrical relay block 120 to the base plate 110.

In one embodiment, the base plate 110 has a general shape similar to an end face of the MSD 105 to which the base mounting plate 110 is mounted. In the illustrated embodiment, the base mounting plate 110 is generally square or rectangular and has edges 110a that extend away from a mounting face 110b of the base plate 110 at a right angle. When mounted to the MSD 105, the overall dimensions of the base plate 110 are slightly larger than the end face of the MSD 105 to which the base plate 110 is mounted. This extra dimensions provide sufficient surface area so that one or more sidewall standoff brackets 125, 130, or an electrical relay mounting plate 135 can be attached to the base plate 110. The configuration of the retrofit MSD mounting system 100 allows a technician to mount the MSD 105 to an interior wall of the HVAC unit in a standoff position. In certain embodiments, the edges 110a may include one or more openings through which a technician can insert wire-binding straps 110c to help route wire bundles around the MSD 105.

The retrofit MSD mounting system 100 in various embodiments comprises the base plate 110, and one or more of the standoff brackets 125 and 130, or the electrical relay mounting plate 135. In one embodiment, standoff bracket 125 is a right-angled plate that has a first side 125a that a technician can use to attach the standoff bracket 125 to the MSD 105 and a second side 125b that a technician can use to mount the standoff bracket 125, and thus the inverter, onto a sidewall of an HVAC unit. The angled configuration of the standoff bracket 125 allows a technician to mount the MSD 105 to the sidewall of the HVAC in a standoff position, which provides clearance between the HVAC unit and the inverter, which can serve as a wire chase for existing or added wiring schemes. The first side 125a may be a continuous plate that runs the length of the standoff bracket 125 or it may consist of one or more metal tabs that extend from the second side 125b, as shown in the illustrated embodiment.

A technician can use the standoff bracket 130 by itself or in conjunction with the standoff bracket 125, along with the base plate 110. As previously mentioned, the standoff bracket 130 has a general configuration that is similar to the shape of the base plate 110. The standoff bracket 130 has one or more standoff supports 130a that extend from the standoff bracket 130 at least by 90 degree and have a length sufficient to create a space between the standoff bracket 130 and the interior wall of the HVAC to which it is to be mounted. The standoff supports 130a may be a continuous piece of angled metal that extends from the main body of the standoff bracket 130 or the standoff supports 130a may be individual leg members, as shown in the illustrated embodiment of FIG. 1. The legs 130a may also include optional openings 130b through which a technician can insert screws 130c to attach the standoff bracket 130 to the HVAC interior wall. In addition, the standoff bracket 130 may have other optional holes 130d through which a technician can use screws to attach the base plate 110 to the standoff bracket 130. The standoff supports 130a have a standoff length sufficient to allow wires or cables to be routed under the standoff bracket 130, in effect forming a wire or cable chase area between the interior wall of the HVAC unit and the standoff bracket 130. The standoff distance allows the placement of the standoff bracket 130 within an interior of the HVAC unit that often has existing wires, without the need to reroute the wires or cable, which can be time consuming and create wiring errors. The retrofit MSD mounting system 100 can be used as part of a retrofit assembly as disclosed herein.

Figure 2:
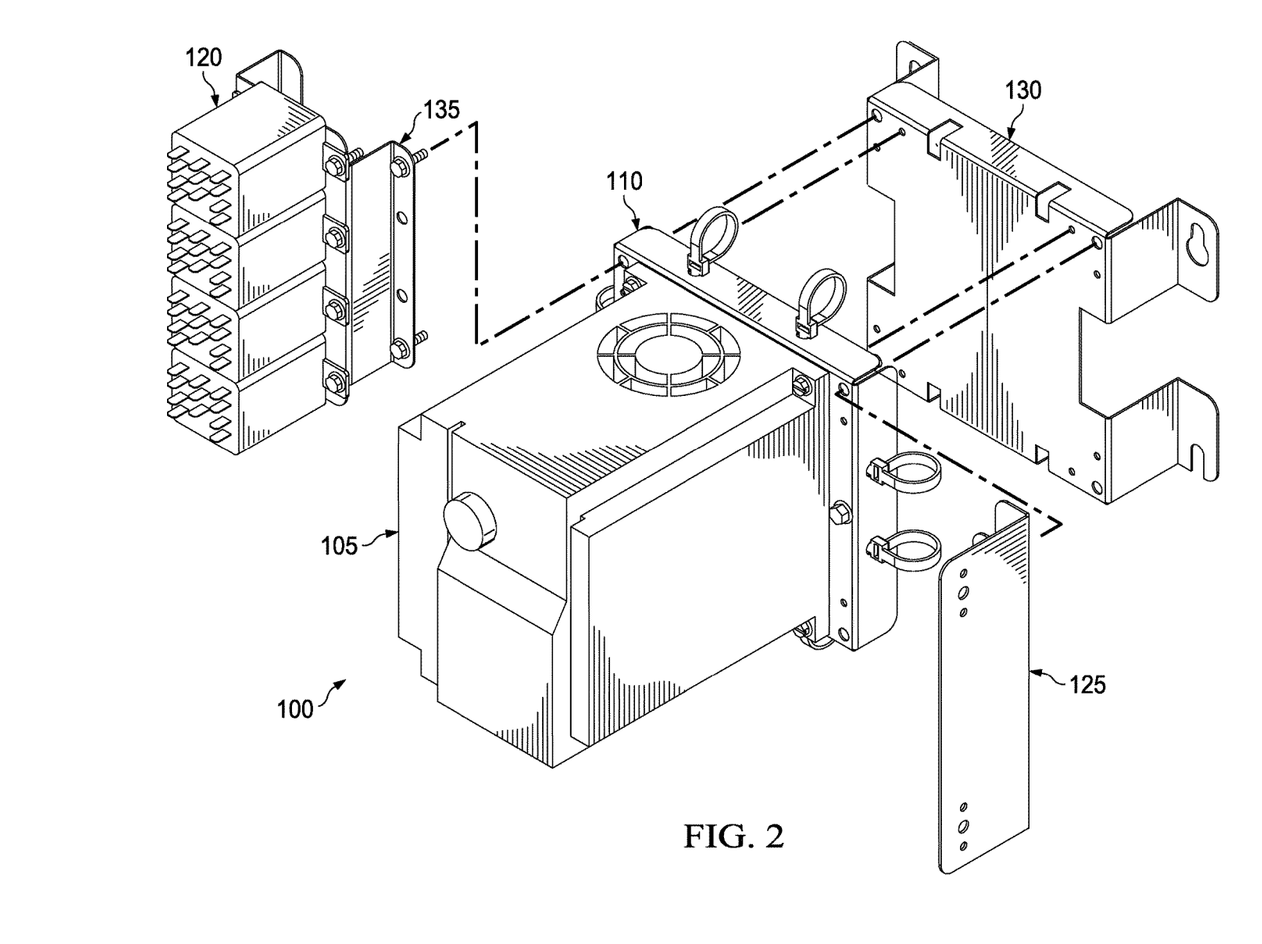
FIG. 2 illustrates another view of the retrofit standoff mounting and wiring system of FIG. 1 that illustrates a positional relationship of the base plate and the MSD.

FIG. 2 illustrates a diagram of the retrofit MSD mounting system 100 of FIG. 1 wherein the base mounting plate 110 is mounted to the MSD 105 and the relay block 120 is mounted on the electrical relay mounting plate 135. As mentioned above, a technician may use conventional means, such as screws, sheet metal screws, bolts, adhesives, and other coupling means and systems to secure the various components together.

Figure 3:
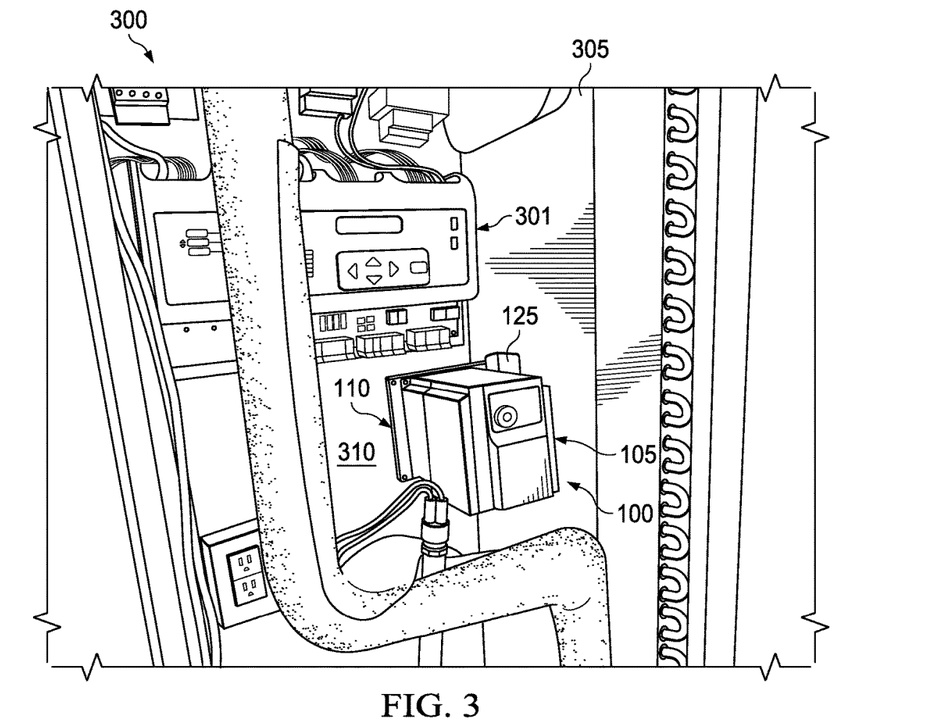
FIG. 3 illustrates one embodiment of the retrofit standoff mounting and wiring system of FIG. 1 positioned within an interior of an HVAC housing.

FIG. 3 illustrates a conventional HVAC unit 300, such as a RTU, in which the embodiments of the present disclosure may be used. The HVAC unit 300 is of conventional design and includes a number of components that condition air in an enclosed space, such as compressors, condensers and evaporators, a controller and wiring that connects various electrical components together in an operative fashion. The controller is identified in FIG. 3 as component 301 and is configured to direct operation of the HVAC unit 300 as a CAV unit. As seen in the illustrated embodiment, the retrofit MSD mounting system 100 is shown attached to a sidewall 305 of the HVAC unit 300 by use of the standoff bracket 125.

The MSD 105 is attached to the base plate 110 and the base plate 110 is attached to the standoff bracket 125. The standoff bracket 125 secures the MSD 105 in a standoff position, such that a space exists between the MSD 105 and the sidewall of the HVAC unit 300, as seen in FIG. 3. FIG. 3 is for illustrative purposes only, and it should be understood that the embodiments of standoff bracket 130, as discussed above, may be used either in conjunction with standoff bracket 125 or alone. In such cases, standoff bracket 130 would be attached to the base plate 110 and secure the MSD 105 in a standoff position, such that a space would exist between the standoff bracket 130 and a back wall 310 of the HVAC unit 300.

Figure 4:
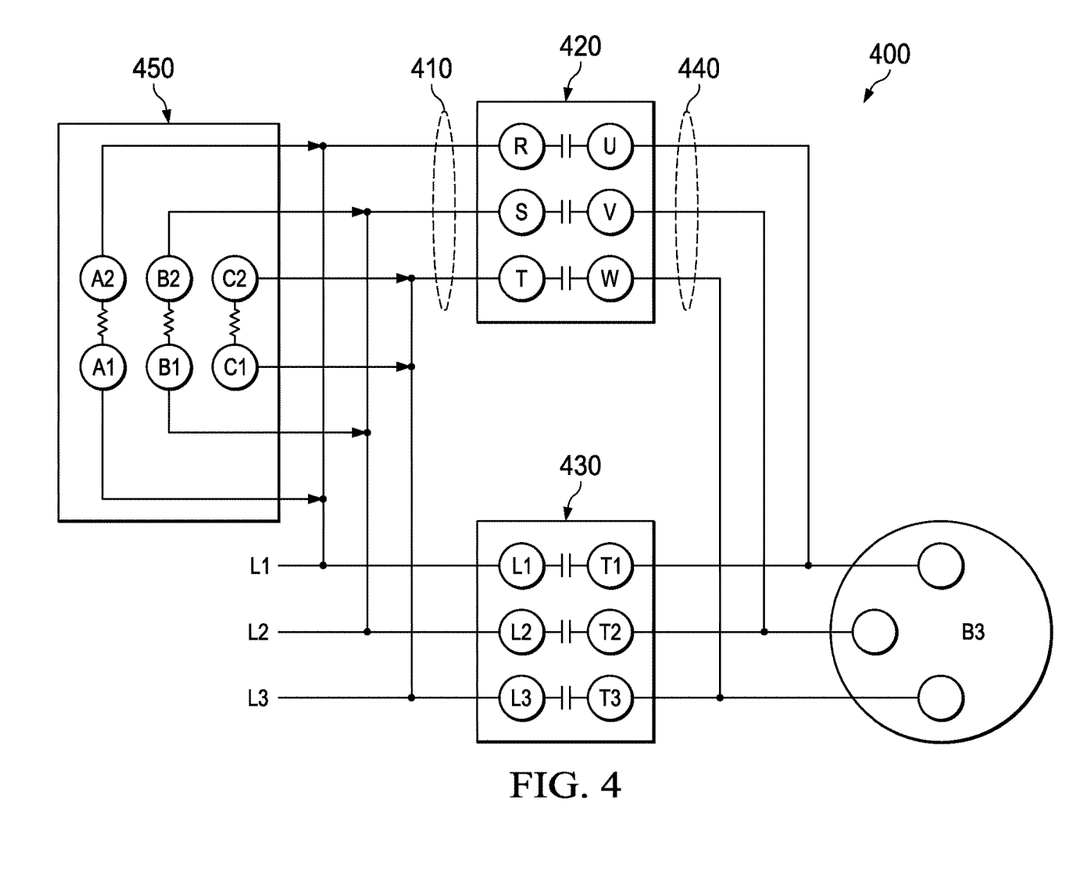
FIG. 4 illustrates a schematic wiring diagram of an embodiment of an electrical conversion system that illustrates a power supply conversion circuit of a retrofit assembly constructed according to the principles of the disclosure.

FIG. 4 illustrates a schematic wiring diagram of an embodiment of an electrical conversion system that illustrates a power supply conversion circuit 400 of a retrofit assembly constructed according to the principles of the disclosure. The power supply conversion circuit 400 allows the conversion of a single speed blower of an HVAC system or unit, such as a RTU, to a multi-speed blower without removing or rerouting existing wires of the HVAC unit. The HVAC unit can be the HVAC unit 300. The power supply conversion circuit 400 includes a first harness 410, a MSD 420, a distribution block 430 and a second harness 440. A blower motor is also illustrated in FIG. 4 and denoted as B3.

The first harness 410 includes three conductors or wires that provide power to the MSD 420. The power is provided from the HVAC unit or building where the HVAC unit is installed via the distribution block 430. The three conductors of the first harness 410 connect to respective terminals of the distribution block 430 that terminate the provided power from conductors identified in FIGS. 4 as L1, L2 and L3. The three conductors of the first harness 410 also connect to terminals R, S and T of the MSD 420 to provide the existing power from L1, L2 and L3 to the MSD 420. The R, S, T terminals of the MSD 420 are the input power terminals that receive incoming power. The distribution block 430 is the existing contactor for the blower motor of the HVAC unit. Converting the contactor to the distribution block 430 allows employing the first harness 410 and the existing power supply lines L1, L2, L3, to provide power to the MSD 420 without rewiring the existing wires of the HVAC unit.

The MSD 420 is configured to provide power to the blower motor to operate the blower motor at multiple speeds according to thermostat calls. A control interface, such as discussed below with respect to FIG. 5, advantageously directs operation of the MSD 420 based on the thermostat calls to control the blower motor to operate at the desired speeds. The power for the desired speeds is provided to the blower motor from the MSD 420 via the second harness 440.

The distribution block 430 is the existing contactor that was used to provide power to the blower motor. The three conductors of the second harness 440 are connected to the terminals of the distribution block 430 where the three conductors T1, T2, T3, that provide power to the blower motor are terminated. The other end of the three conductors of the second harness 440 are terminated at the output power terminals of the MSD 420, which are denoted as terminals U, V, and W in FIG. 4. The conductors and connectors of the first and second harnesses 410, 440, can be conventional conductors and connectors used in HVAC units.

FIG. 4 also illustrates a coil choke 450 that is included in some embodiments of the power supply conversion circuit 400. In one embodiment, the coil choke 450 is a line reactor configured to dampen high frequencies carried by the power signal in certain installations. The first harness 410 includes conductors that couple the coil choke 450 to L1, L2, L3, when the coil choke is employed.

Figure 5:
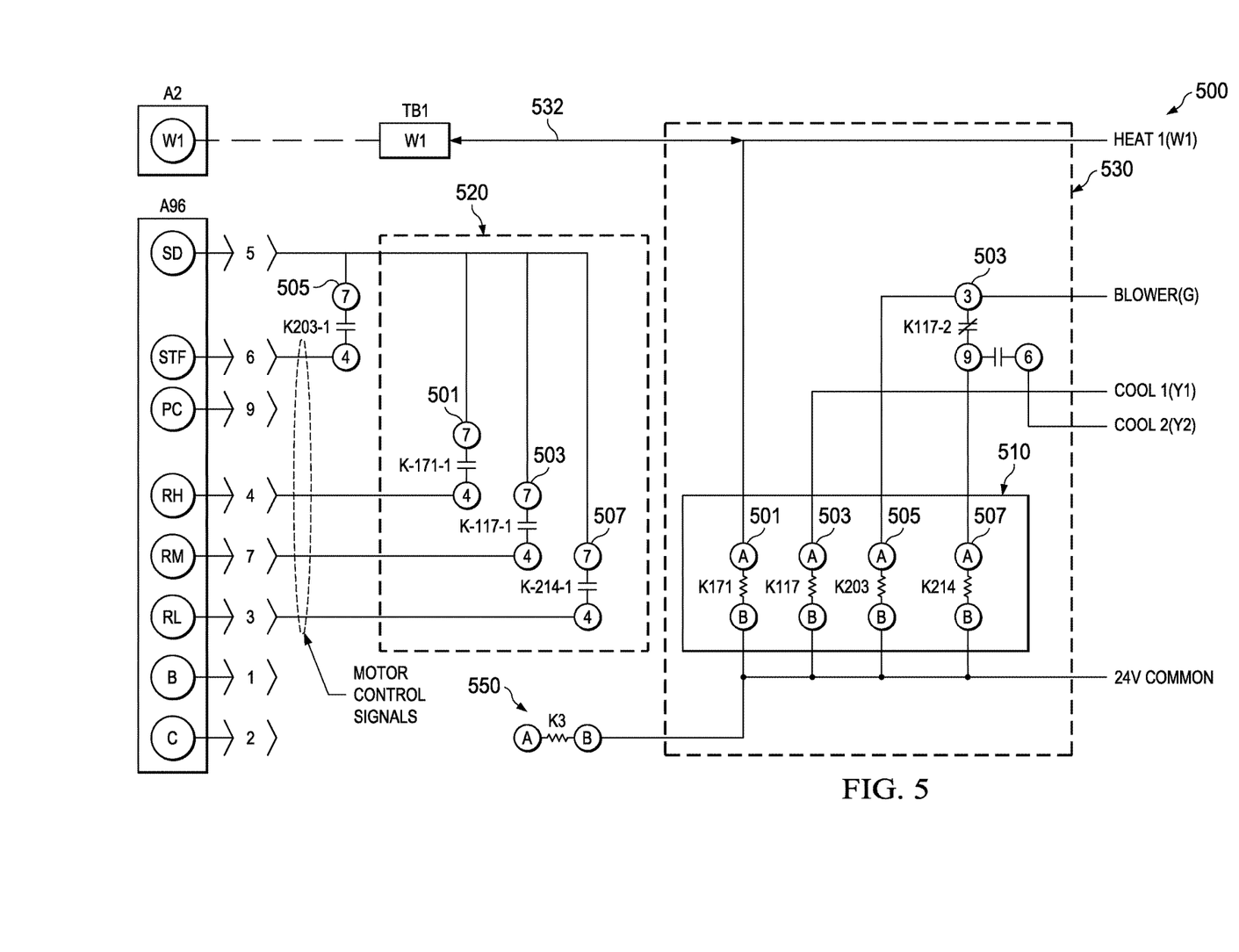
FIG. 5 illustrates a schematic wiring diagram of an embodiment of an electrical conversion system that illustrates a control interface of a retrofit assembly constructed according to the principles of the disclosure.

FIG. 5 illustrates a schematic wiring diagram of an embodiment of an electrical conversion system that illustrates a control interface 500 of a retrofit assembly constructed according to the principles of the disclosure. The control interface 500 allows the same thermostat calls used with an existing single speed blower to be used to provide multi-speed control. The control interface 500 is configured to differentiate each of the thermostat calls, or differentiate multiple thermostat call signals, and provide a MSD with the correct translated signal to coordinate the desired blower speed. The control interface 500 includes a relay block 510, a relay contactor harness 520 and a relay coil harness 530.

The relay block 510 is configured to provide motor control signals to the MSD based on the thermostat calls. The relay block 510 includes four relays that receive the thermostat calls at the coil terminals and are connected to the MSD via contact terminals of the relays and the relay contactor harness 520. In one embodiment, the relay block only includes four relays. The relay contactor harness 520 also provides the motor control signals to the MSD. The various thermostat calls are provided to respective coil terminals of the relay block 510 by the relay coil harness 530. The relay contactor harness 520 and the relay coil harness 530 are represented in FIG. 5 by the conductors within the respective dashed boxes, 520 and 530.

Each of the relays of the relay block 510 is a double pole, double throw relay. The four relays of the relay block 510 are a heat speed relay 501, a blower cooling speed relay 503, a MSD control relay 505, and a continuous low speed relay 507. The relay coils and some of the contacts of the relays of the relay block 510 are illustrated in FIG. 5. One skilled in the art will understand that the contacts of each of the particular relays correspond to the relay coils identified in the relay block 510. As illustrated in FIG. 5, one side of the relay coil of each relay of the relay block 510 is connected to ground. The existing contactor for the blower motor, identified in FIG. 5 as element 550, is also shown connected to the ground. As discussed above, the blower motor contactor is disabled and used as a distribution block for a power supply distribution circuit such as illustrated in FIG. 4. The operating voltage of the relay block 510 corresponds to the voltage level of the thermostat calls. In one embodiment, the operating voltage is 24 volts DC.

The relay coil harness 530 also includes a conductor 532 that is for a heat pump if needed. As illustrated in FIG. 5, the conductor 532 is connected to a terminal block TB 1 for connection to a heat pump terminal block A2 if a heat pump is present. A dashed line between terminal block TB1 and terminal block A2 represents the optional feature provided by the relay coil harness 530.

In one embodiment, the relay contactor harness 520 is connected to the MSD employing a jack and a plug. As such, an easy connection is provided by the relay contactor harness 520 to the MSD. The plug and jack connection can also prevent, or at least reduce, wiring errors. The MSD is represented in FIG. 5 by terminal block A96. The noted terminals of the terminal block A96 are connected to the relay contactor harness 520 as shown in FIG. 5.

The relay contactor harness 520 provides the motor control signals to the MSD via the MSD terminal block A96. The MSD employs the motor control signals to provide the desired power to the blower motor. The motor control signals provided to the MSD correspond to operating speeds of the blower motor as such: "RL" is for run low, "RM" is for run medium, "RH" is for run high, and "STF" is a forward start (input) signal. "SD" is the 24 VDC ground of the MSD.

Table 1 below provides a key describing the operation of the blower motor based on the motor control signals received via the control interface 500 from the thermostat calls. Column includes the thermostat calls received via the relay coil harness 530 and column 2 includes the motor control signals provide to the MSD from the relay block 510 via the relay contactor harness 520. The resulting blower speed is provided in column 3.

TABLE 1

Table of Operations for Retrofit Assembly

| THERMOSTAT CALLS | MSD RECEIVED SIGNAL | BLOWER SPEED |
|---|---|---|
| G | STF, RL | 1 |
| G, Y1 | STF, RM | 2 |
| G, Y1, Y2 | STF, RL, RM | 3 |
| W1, OVERRIDE ALL OTHER CALLS | STF, RH | 4 |

Accordingly, introduced herein are various embodiments of a retrofit assembly used to convert a CAV HVAC system to a MSAV HVAC system. The retrofit assembly can be used with RTUs as disclosed herein. The retrofit assembly includes a MSD mounting system and an electrical conversion system. As disclosed herein, the electrical conversion system includes a power supply conversion circuit and a control interface. The power supply conversion circuit and the control interface advantageously employ harnesses to prevent rewiring and translate control signals. The harnesses represented in FIG. 4 and in FIG. 5 are illustrated as individual conductors to show the connections. One skilled in the art will understand that the individual illustrated wires are bound together to form the noted harnesses.

In the illustrated embodiments, the retrofit assembly is used to control blower speed. One skilled in the art will understand that the retrofit assembly can also be used to convert other single speed motors to multi-speed. For example, the retrofit assembly, or at least a part thereof, can be used to add capabilities to control condenser fan motors. One such capability can be for low ambient temperatures. A portion of the retrofit assembly, such as the electrical conversion system, could also be used in original manufactured products to provide controls.

The retrofit assembly could also be used to add a third speed capability for cooling. For example, some MSDs are capable of providing multiple discreet speeds; even up to twenty four discreet speeds. On HVAC units having more than two cooling stages, the thermostat is capable of calling for Y1, Y2, Y3, Y4 and so on. In the illustrated embodiment of FIG. 5, Y1 sends a signal to A96-RM and Y2 sends a signal to A96-RM & A96-RL. If a third cooling speed is desired, Y3 could be used to send signals to A96-RM & A96-RH.

Those skilled in the art to which this application relates will appreciate that other and further additions, deletions, substitutions and modifications may be made to the described embodiments.

What is claimed is:

1. A retrofit multi speed driver mounting assembly for mounting to an interior wall of a heating ventilating and air conditioning system, the retrofit multi speed driver mounting assembly comprising:

a multi speed driver having an MSD mounting face;
a base plate having a rectangular shape and having a planar central portion that defines a base mounting face and having bent edges that extend away from the base mounting face at a right angle, and wherein the planar central portion is sized and configured to receive the MSD mounting face of the multi speed driver, wherein the planar central portion of the base plate has an area greater than the MSD mounting face of the multi speed driver when in an assembled position to define a mounting margin;
a sidewall standoff bracket coupled to a portion of the base mounting face of the base plate on the mounting margin, wherein the sidewall standoff bracket comprises a right angle plate that has a first side that is parallel to the central planar portion of the base plate when assembled and that is used to couple the sidewall standoff bracket to the base plate, the right angle plate further comprises a second side that is at a right angle to the first side of the right angle plate for mounting to a sidewall of the heating ventilating and air conditioning system; and
a backwall sidewall standoff bracket comprising a central planar portion and one or more standoff supports that extend from the central planar portion of the backwall standoff bracket at a right angle thereto, and wherein the one or more standoff supports is sized to create a space between the central planar portion of the backwall standoff bracket and a backwall of the heating ventilating and air conditioning system to form a wire chase.

2. The retrofit multi speed driver mounting system of claim 1, wherein at least one of the bent edges is formed with an opening and further comprising a wire-binding strap inserted into the opening.

3. The retrofit multi speed driver mounting system of claim 1, further comprising an electrical relay mounting plate coupled to a second side of the base plate on the mounting margin opposite the sidewall standoff bracket.

4. A retrofit multi speed driver mounting assembly for mounting to an interior wall of a heating ventilating and air conditioning system, the retrofit multi speed driver mounting assembly comprising:

a multi speed driver having an MSD mounting face;
a base plate having a rectangular shape and having a planar central portion that defines a base mounting face and having bent edges that extend away from the base mounting face at a right angle, and wherein the planar central portion is sized and configured to receive the MSD mounting face of the multi speed driver, wherein the planar central portion of the base plate has an area greater than the MSD mounting face of the multi speed driver when in an assembled position to define a mounting margin; and
a sidewall standoff bracket coupled to a portion of the base mounting face of the base plate on the mounting margin, wherein the sidewall standoff bracket comprises a right angle plate that has a first side that is parallel to the central planar portion of the base plate when assembled and that is used to couple the sidewall standoff bracket to the base plate, the right angle plate further comprises a second side that is at a right angle to the first side of the right angle plate for mounting to a sidewall of the heating ventilating and air conditioning system.

* * * * *